(12) United States Patent
Bruno

(10) Patent No.: US 11,383,565 B1
(45) Date of Patent: Jul. 12, 2022

(54) TOW BAR FOR SCOOTER

(71) Applicant: Jocelyn Bruno, Cibolo, TX (US)

(72) Inventor: Jocelyn Bruno, Cibolo, TX (US)

( * ) Notice: Subject to any disclaimer, the term of this patent is extended or adjusted under 35 U.S.C. 154(b) by 0 days.

(21) Appl. No.: 17/065,314

(22) Filed: Oct. 7, 2020

(51) Int. Cl.
*B60D 1/155* (2006.01)
*B62B 5/00* (2006.01)
*B60D 1/48* (2006.01)
*B60D 1/00* (2006.01)

(52) U.S. Cl.
CPC ............ *B60D 1/155* (2013.01); *B60D 1/481* (2013.01); *B62B 5/0079* (2013.01); *B60D 2001/005* (2013.01)

(58) Field of Classification Search
CPC ...... B60D 1/167; B60D 1/1675; B60D 1/155; B60D 1/481; B60D 2001/005; B60D 2001/006; B60D 1/04; B60D 1/065; B60D 1/52; B60D 1/54; B60D 1/145; B60D 1/44; B60B 5/0079; B60B 5/002; B60B 5/0026; B60B 5/0016; B60B 2207/00
USPC ......... 280/482, 491.2, 491.5, 493, 492, 494, 280/498, 504, 304.1, 33.992
See application file for complete search history.

(56) References Cited

U.S. PATENT DOCUMENTS

| | | | | |
|---|---|---|---|---|
| 1,479,182 A * | 1/1924 | Jeschke | ................ | B60D 1/145 280/505 |
| 3,741,578 A * | 6/1973 | Dumont | ................ | B62M 27/02 280/24 |
| 4,174,120 A * | 11/1979 | Freeman | ................ | B62K 27/12 280/204 |
| 4,305,601 A * | 12/1981 | Berge | ................ | A61G 5/10 280/304.1 |
| 4,729,576 A * | 3/1988 | Roach | ................ | A61G 7/0503 280/292 |
| 5,172,927 A * | 12/1992 | Bobb | ................ | A61G 5/10 248/231.31 |
| 5,374,074 A * | 12/1994 | Smith | ................ | A61G 5/10 280/304.1 |
| 6,702,313 B2 * | 3/2004 | Forshee | ................ | A61G 5/10 280/304.1 |
| 6,854,756 B1 | 2/2005 | Solberg | | |
| 7,658,569 B2 | 2/2010 | de Oliveira | | |
| 7,699,128 B1 * | 4/2010 | Strauss | ................ | B62B 5/0026 180/23 |
| 9,033,357 B1 | 5/2015 | Merchant | | |
| 9,150,064 B1 * | 10/2015 | Landreth | ................ | B60D 1/18 |
| 9,308,790 B1 * | 4/2016 | Sharp | ................ | B60D 1/167 |
| 10,183,719 B2 | 1/2019 | McManus | | |
| 10,675,930 B1 * | 6/2020 | Ramstad | ................ | B60D 1/155 |

(Continued)

*Primary Examiner* — Anne Marie M Boehler
(74) *Attorney, Agent, or Firm* — Volta Law Group

(57) ABSTRACT

A tow bar apparatus for a motorized utility cart is provided. The apparatus allows a utility cart user to tow a shopping cart. The tow bar is adapted to attach to any shopping cart by way of a universal attachment member. The opposing end of the apparatus includes a pair of spaced of laterally spaced attachment arms which are joined to a transverse attachment bar having clamps adapted for connection to the shopping cart. The universal attachment member is removably attached and may be modified to accommodate a specific make and model of scooter. The apparatus is reconfigurable depending upon the physical layout of the utility cart. An articulating arm is connected between the attachment member and the attachment arms to allow for an articulating attachment to the shopping cart.

9 Claims, 2 Drawing Sheets

(56) References Cited

U.S. PATENT DOCUMENTS

| | | | |
|---|---|---|---|
| 10,695,241 B2 | 6/2020 | Slorance | |
| 2002/0158444 A1* | 10/2002 | DeTournay | B62B 7/008 |
| | | | 280/491.2 |
| 2012/0199716 A1* | 8/2012 | Youngblood | B62B 5/0016 |
| | | | 248/316.1 |
| 2019/0380894 A1* | 12/2019 | Ellis | B60D 1/486 |

* cited by examiner

TOW BAR FOR SCOOTER

1. FIELD OF THE INVENTION

The present invention generally relates to an apparatus for towing wheeled vehicles. More specifically, the present invention relates to an apparatus for towing a shopping cart with a motorized utility cart or scooter.

BACKGROUND OF THE INVENTION

As baby boomers age, there is a rapidly growing market for personal or one person motorized utility carts or scooters for use both indoors and outdoors. Most frequently such scooters have been used by people who have been permanently or temporarily incapacitated in a way that makes walking difficult or impossible.

Since such carts are designed for inside use, they are of a width which enables them to pass easily through normal door openings. Thus, they can easily be used for navigating through stores and shopping malls. A problem which occurs while shopping is the lack of cargo space on the scooter. Numerous attempts to provide for cargo space on scooters have been made, the attempts typically involve positioning a basket on the scooter, the basket providing very limited cargo space.

Accordingly, it would be desirable to provide a way of increasing the cargo space of a scooter.

A tow bar apparatus for a motorized utility cart is provided. The apparatus allows a utility cart user to tow a shopping cart. The tow bar is adapted to attach to any shopping cart by way of a modifiable attachment member releasably attached to one end of an articulating tow bar. The opposing end of the apparatus includes a pair of laterally spaced attachment arms and a transverse attachment bar for connecting to a shopping cart. The apparatus is reconfigurable depending upon the physical layout of the utility cart. An articulating arm is connected between the attachment member and the attachment arms to allow for an articulating attachment to the shopping cart.

SUMMARY OF THE INVENTION

It is a major object of the invention to provide a tow bar apparatus for a motorized utility cart.

It is another object of the invention to provide a tow bar apparatus for a motorized utility cart which allows for articulated towing of a shopping cart.

It is another object of the invention to provide a tow bar apparatus for a motorized utility cart that can be attached to virtually any wheeled shopping cart It is another object of the invention to provide a tow bar apparatus for a motorized utility cart that can be modified for attachment to a variety of utility carts.

It is another object of the invention to provide a tow bar apparatus for a motorized utility cart that allows for articulated attachment to a shopping cart.

DETAILED DESCRIPTION

Figure 1:
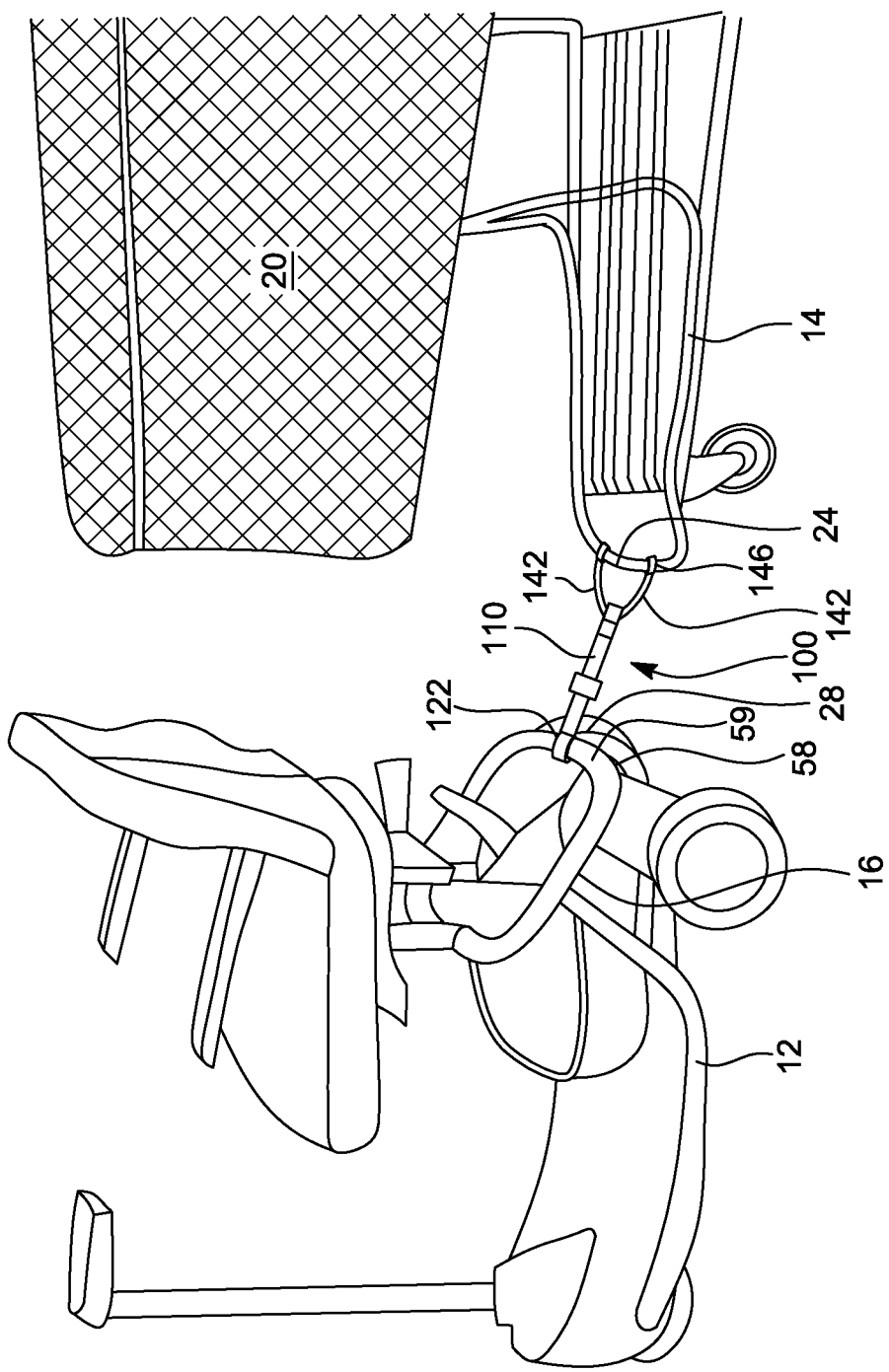
FIG. 1 shows a side perspective view of the tow bar apparatus of the invention attached between a utility cart and a shopping cart.
Figure 2C:
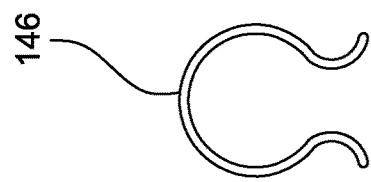
FIG. 2C shows a detail of the alternative embodiment.
Figure 2B:
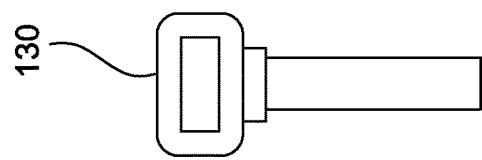
FIG. 2B shows a plan view of a pull handle used with the embodiment of FIG. 4A.
Figure 2A:
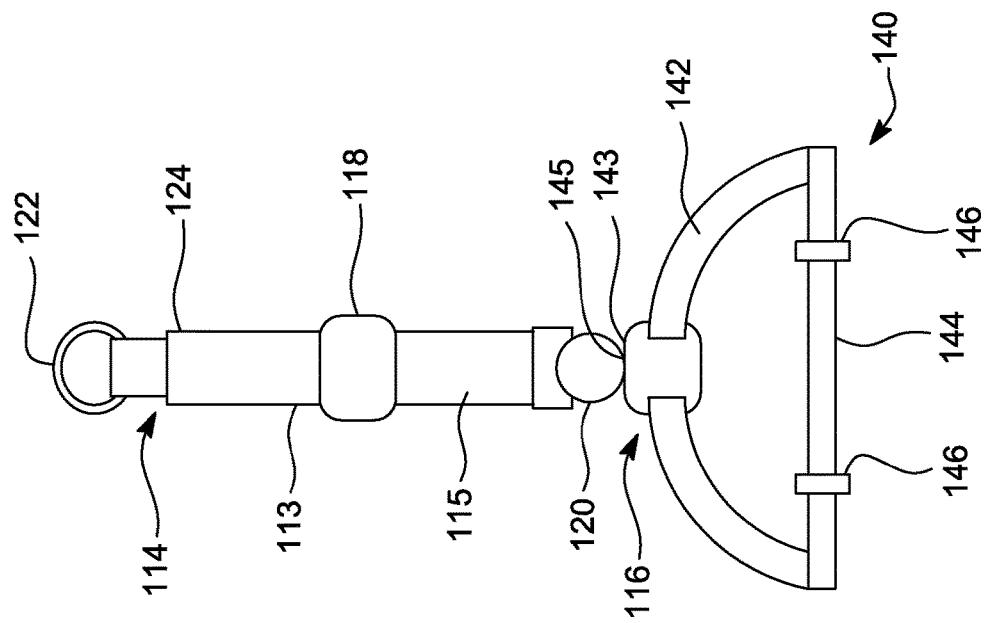
FIG. 2A shows a plan view of an alternative embodiment of the tow bar apparatus.

Referring now to FIGS. 1-3, the present invention is directed to a tow bar apparatus, generally indicated by the numeral 100, that can be used to connect a motorized utility cart or scooter 12 to a shopping cart 14. Scooters 12 have a chassis, to which a motor and battery are attached, the motor or battery contained within a generally rearwardly housing 16, which housing 16 will have varying shapes depending upon make and model.

The shopping cart 14 includes a frame 20 supported on four wheels 22. The frame 20 includes generally vertical support members 16 which support the basket. The lower frame is generally horizontal and is formed of tubular lower support beams 24 which form a shelf upon which items mat be rested. Virtually all shopping carts made have these features in one form or another. The front support beam 24, being elongated and running transverse to the direction of travel of the cart 14 is the designated attachment point of the invention.

The tow bar apparatus 100 is designed to attach to the front support beam 24 of a standard shopping cart 14. Alternatively, the apparatus 100 may be attached to any sturdy transverse framing member located on the lower portion of the cart 14. It can be seen that the tow bar apparatus 100 has an elongated articulating bar 110. As configured in FIG. 2, the apparatus 100 is designed for connection to a Golden Technology mobility scooter model GL-111. This make and model of scooter has a tubular mounting bracket 58 having a transverse component 59 extending from the rear which allows for an easy connection as described above. If the housing of the scooter 12 to be used with the invention includes a weight bearing or otherwise sufficiently robust transverse component such as a rod or rail the apparatus 100 may be attached there. Virtually all models of scooter have a telescoping upstanding member 60 upon which the seat 62 is positioned. This can also be used as an attachment point. In accordance with the invention, modifications to the attachment member connected to articulating bar 110 may be made to allow for a reliable connection to the cart 14. As there is a single attachment member on one end of the bar 110, the attachment point needs to be central to the scooter 12 and sturdy enough to handle the forces exerted while towing.

Articulating bar 110 is composed of two segments 113, 115, with segment 113 nested inside of segment 115. A rotatable member 118 allows for relative axial movement (when loosened) of the segments 113, 115 to allow for extension and retraction of the bar 110 to effect lengthening of the bar as is known with nested telescoping poles. Articulating bar 110 has opposing ends 114 and 116 modifiably fashioned for attachment between a scooter 12 and a shopping cart 14. The inner segment 113 is connected to an annular attachment member 122 at end 114. A ball joint 120 connected to segment 115 allows for bending of the bar 110 to effect articulated towing of the shopping cart 14. Attachment member or pull ring 122 is attached to end 114 of the bar 110 as by way of threads 124 disposed interiorly of the bar 110. The pull ring 122 can be attached to any sturdy upstanding or transverse member on the scooter 12 or scooter motor housing, provided the member is sufficiently robust. The pull ring 122 may be fashioned to have an opening to allow for placement about an attachment point in the manner of a key ring or similar connecting device. Pull ring 122 can also be configured as a spring loaded grasping hook or other member attachable to upstanding member 60 for connection to the cart 12. As has been mentioned, a pull ring 122 or other similar annular connecting or attaching member would allow for a centralized, pivoting, single point connection to the scooter 12 to allow for articulation at the attachment point if attached to an upstanding, centrally positioned attachment point as shown in FIG. 1. One alternative to pull ring 122 is a pull handle 130 which can be interchangeably positioned on the bar 110 via threads 124. The pull handle 130 is configured for manual grasping so that the user can tow the cart 14 by hand. Other attaching members specifically designed for a particular scooter 12 may be fashioned and attached to bar 110.

For stable connection to the cart 12, the opposing end 116 of the bar 110 has an attachment member 140 with opposing arms 142, the member 140 removably connected as by threaded attachment 143 to a short length of tubing 145 connected to ball joint 120. The opposing arms 142 are connected at their laterally spaced ends by a transverse bar 144 having spaced clamping members 146 positioned thereon. The clamping members 146 are spring loaded to allow for clamping onto the transverse bar of the cart 14. The spaced relation of clamping member 146 improves stability of the apparatus 100 when towing.

In use, the user can connect the apparatus 100 between the scooter 12 and shopping cart 14 using the attachments and methods described above. The effective length of the apparatus 100 is adjusted to allow for smooth articulated towing of the shopping cart 14.

I claim:

1. A tow bar apparatus for connecting a motorized utility cart to a shopping cart, comprising:
    a telescoping articulating bar;
    a first attachment member positioned at one end of the telescoping articulating bar for attachment to the motorized utility cart at a single centralized pivoting point;
    a second attachment member positioned on an opposing end of the telescoping articulating bar for attachment to the shopping cart, said second attachment member formed as a pair of spaced arms connected by a transverse bar;
    a pair of spring loaded clamps positioned along the transverse bar in spaced relation for attachment to the shopping cart;
    a rotatable member on said telescoping articulating bar to permit axial adjustment of said first attachment member with respect to said second attachment member.

2. The apparatus of claim 1 wherein said first attachment member is a pull ring.

3. The apparatus of claim 2, wherein said pull ring may be opened for positioning about an attachment point on said utility cart.

4. The apparatus of claim 2 wherein said pull ring is removably connected to said telescoping articulating bar.

5. The apparatus of claim 1 further comprising a ball joint between said telescoping articulating bar and said second attachment member.

6. The apparatus of claim 5 wherein said ball joint allows for bending of said telescoping articulating bar.

7. The apparatus of claim 1 wherein said second attachment member is removably connected to said telescoping articulating bar.

8. A tow bar apparatus for connecting a motorized utility cart to a shopping cart, comprising:
    a telescoping articulating bar comprised of a first segment and a second segment that telescopes with respect to said first segment;
    a first attachment member positioned at one end of the telescoping articulating bar for attachment to the motorized utility cart at a single centralized pivoting point, said first attachment member comprises a pull ring threaded to the first segment of the telescoping articulating bar;
    a second attachment member positioned on an opposing end of the telescoping articulating bar for attachment to the shopping cart, said second attachment member comprising a pair of spaced arms connected by a transverse bar, said pair of spaced arms attached to the second segment via a ball joint; and
    a pair of spring loaded clamps positioned along the transverse bar in spaced relation for attachment to the shopping cart.

9. The apparatus of claim 8, further comprising a rotatable member on said telescoping articulating bar to permit axial adjustment of said first attachment member with respect to said second attachment member.

* * * * *